Figure 1:
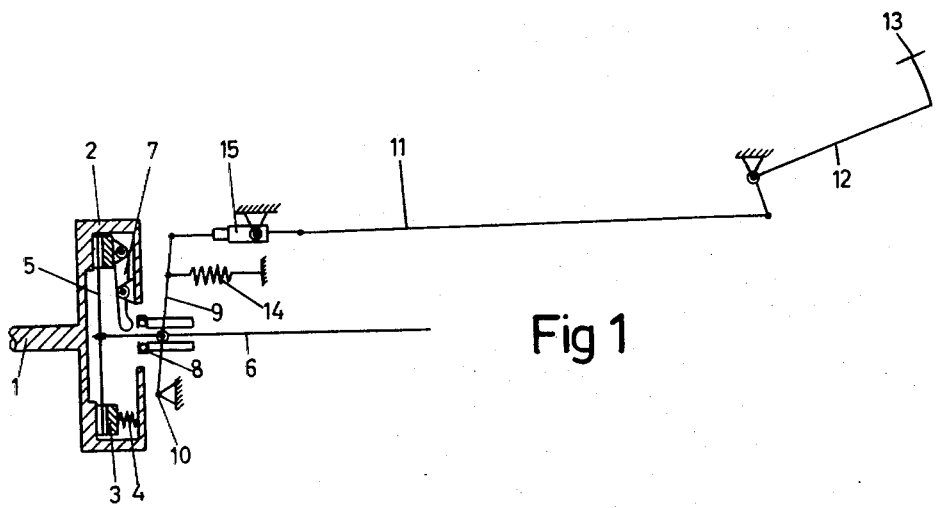

United States Patent [19]
Dahlkvist et al.

[11] 3,765,522
[45] Oct. 16, 1973

[54] CLUTCH-RELEASE LINKAGE AUTOMATIC AXIAL-ACTING SLACK ADJUSTER

[75] Inventors: Nils Goran Dahlkvist, Darlington, England; Nils Borje Lennart Sander, Malmo, Sweden

[73] Assignee: SAB Brake Regulator Company Limited, Darlington, Co. Durham, England

[22] Filed: July 26, 1971

[21] Appl. No.: 165,905

[30] Foreign Application Priority Data
Aug. 24, 1970 Great Britain.................. 40,619/70

[52] U.S. Cl. ......... 192/111 A, 188/196 BA, 287/62
[51] Int. Cl. .............................................. F16d 13/75
[58] Field of Search ............................... 192/111 A; 188/196 V, 196 BA

[56] References Cited
UNITED STATES PATENTS

| | | | |
|---|---|---|---|
| 2,072,010 | 2/1937 | Moorhouse | 192/111 A |
| 3,117,661 | 1/1964 | Waclawek | 192/111 A |
| 2,160,752 | 5/1939 | Oliver | 192/111 A |
| 3,365,042 | 1/1968 | Smirl et al. | 192/111 A |
| 3,437,180 | 4/1969 | Natschke et al. | 188/196 BA |

*Primary Examiner*—Benjamin W. Wyche
*Attorney*—Laurence R. Brown

[57] ABSTRACT

A slack adjuster linkage is incorporated in a clutch release mechanism to standardize the position of movement at which the clutch is operated to compensate for wear and changes in the clutch mechanism.

The slack adjuster is axial-acting and connected in a push rod linkage or hydraulic system operating the clutch mechanism, and includes both a force responsive means such as a spring which responds to a known force and a travel responsive means such as a telescoping rod operable under predetermined force conditions.

5 Claims, 8 Drawing Figures

PATENTED OCT 16 1973 3,765,522

SHEET 1 OF 3

INVENTORS
Nils G. Dahlkvist
Nils B. L. Sander

BY Laurence R. Brown
ATTORNEY

PATENTED OCT 16 1973 3,765,522

SHEET 3 OF 3

INVENTORS
Nils G. Dahlkvist
Nils B. L. Sander
By Laurence R. Brown
Attorney

CLUTCH-RELEASE LINKAGE AUTOMATIC AXIAL-ACTING SLACK ADJUSTER

This invention relates to clutch-release linkage automatic axially-acting slack adjusters of the kind (hereinafter called "the kind defined") comprising a nut rotatable on a screw-threaded rod part which is axially movable for transmitting clutch-release force and for slack-adjustment purposes is telescopically displaceable in relation to an axially-movable force-input part.

Clutch mechanisms of the type used in power-driven vehicles and other machines and having frictionally engaged surfaces on the driving and the driven parts and in which the friction surfaces are kept together by spring force need adjustment of the slack in the linkages for releasing the clutches. Due to the high leverage in a clutch-release linkage it is desirable to initiate and accomplish the release of the clutch travel within a predetermined travel of a force-input part, which travel may for example determine the length of a pedal stroke.

The present invention is intended to provide an automatic slack adjuster of the kind defined which is simple in manufacture and reliable in operation and which can be adapted for use with different types and sizes of clutches without substantial constructional changes.

According to the invention there is provided a slack adjuster of the kind defined, characterised by force-responsive means which respond when the adjuster is transmitting force sufficient to release the clutch, and travel-responsive means which in response to the axial travels of said rod part and said force-input part relative to an axially-immovable housing prevent or permit rotation of said nut, all so arranged that in the event of the adjuster transmitting force sufficient to release the clutch prior to the axial travels in unison of said rod part and said force-input part relative to said housing reaching a predetermined minimum the rod part is telescopically displaced into the force-input part and thereby the slack in the linkage is increased.

Preferably the said force-responsive means is constituted by a prestressed compression spring mounted between and exerting force on the nut and the force-input part.

Figure 2:
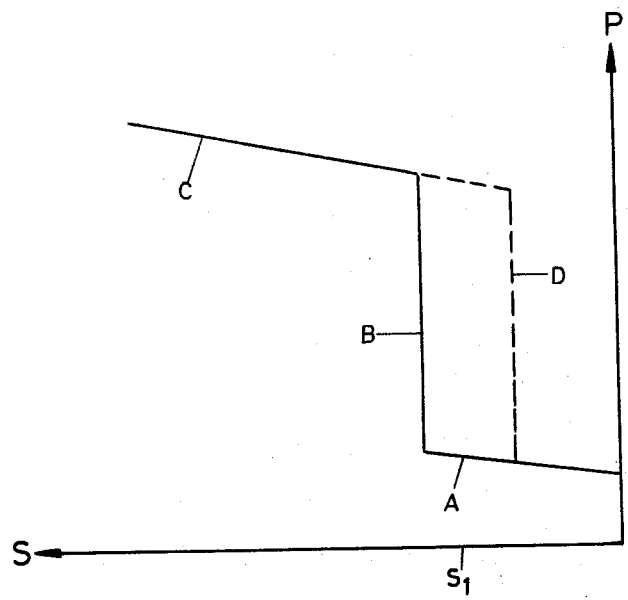
Figure 6:
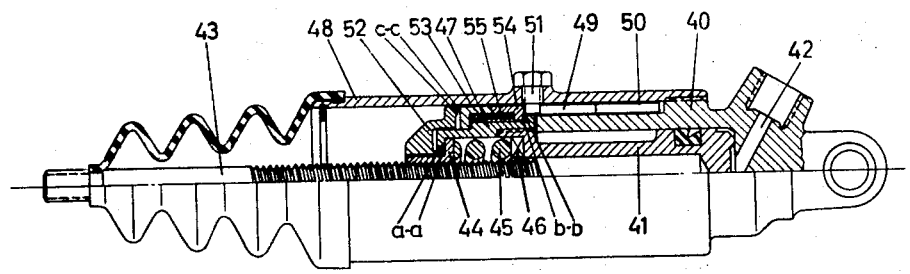
Figure 7:
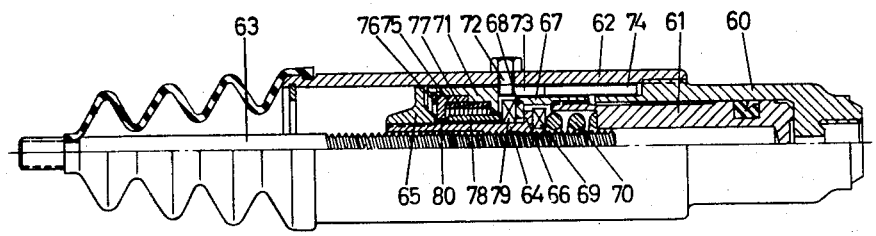
Figure 8:
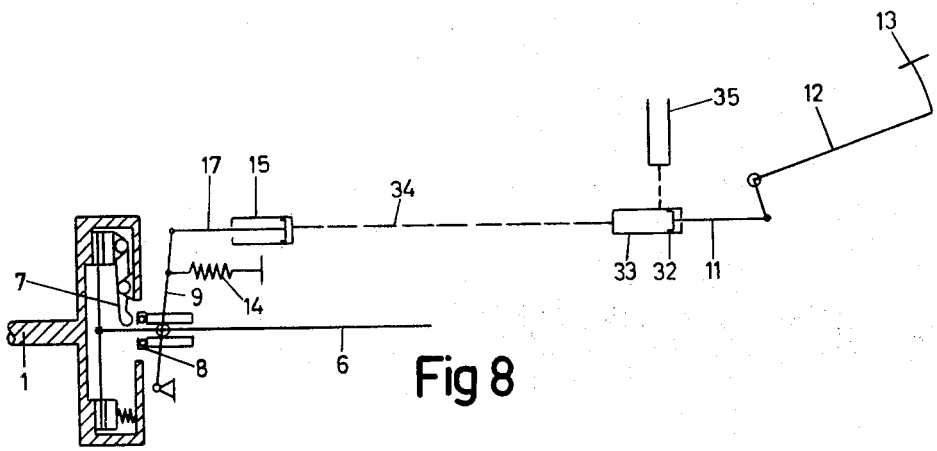

The invention and how it may be performed are described in more detail by way of example with reference to the accompanying drawings, in which FIG. 1 shows schematically a clutch and release linkage provided with an adjuster according to the invention, FIG. 2 is a graph showing the variations in the force transmitted in the clutch release lingage as a function of the travel of a force-input part included in said linkage, FIGS. 3–7 are partly sectional side views of five different adjusters according to the invention, and FIG. 8 shows schematically a clutch-release linkage operated by hydraulic means and in which any one of the adjusters according to FIGS. 4–7 could be used.

FIG. 1 shows schematically a driving shaft 1 rigidly connected to a clutch housing 2 containing a clutch ring 3 which is urged towards the left by compression springs 4. The clutch ring 3 frictionally engages a disc 5 which is rigidly connected to a driven shaft 6. Several two-armed radially-directed levers 7 are pivotally mounted in the housing 2 and are adapted to release the ring 3 from the disc 5 against the force from the springs 4 when the inner ends of the levers 7 are displaced towards the left by means of force through a ball bearing 8. The side ball bearing 8 is connected to a lever 9 pivotally connected at 10 to a stationary part of the machinery. The lever 9 is pivotally connected to a rod part connected through an adjuster comprising a housing 15 to a push rod 11 which in turn is movable by a bell-crank lever 12 provided with a pedal 13. The lever 9 is loaded by a tension return spring 14 urging the lever 9 in clockwise direction. The housing 15 is not axially movable but it is pivotally connected to a stationary part of the machinery and forms part of the slack adjuster.

In the graph shown in FIG. 2 the abscissae in the direction S represent the lengths of the movements of the push rod 11 and the ordinates in the direction P represent the magnitudes of the forces transmitted in the push rod 11.

The line A shows the slight increase in force during an initial movement when the pedal 13 is moved downwardly, this force being derived from the return spring 14. As soon as the ball bearing 8 contacts the levers 7 the force in the rod 11 increases rapidly as shown by the line B due to the resistance offered by the springs 4. The clutch will be released as soon as the force in the rod 11 overcomes the force of the springs 4, and the force during the further movement as the pedal 13 is pushed further down as illustrated by the line C.

As the clutch friction surfaces become worn the springs 4 expand correspondingly and the distances between the ends of the levers 7 and the ball bearing 8 becomes smaller. This distance constitutes most of the slack in the linkage, and if said distance disappears when the clutch is engaged any further wear on the clutch friction surfaces will make it impossible to obtain sufficient clutch-engaging force from the springs 4. An adjustment of the clutch-release linkage is desirable to restore the axial distance between the ball bearing 8 and the inner ends of the levers 7 and thus restore the requisite slack in the linkage.

The dotted lines D in FIG. 2 represent how wear on the clutch friction surfaces may cause the clutch-releasing force in the rod 11 to rise suffciently to overcome the force of the strong springs 4 and release the clutch prior to the axial travel of the rod 11 reaching a desired predetermined minimum.

The housing 15 forms part of a slack adjuster which automatically increases the slack in the clutch-release linkage in case a force corresponding to that of the springs 4 is obtained in the rod 11 after a distance of travel which is too short.

Figure 3:
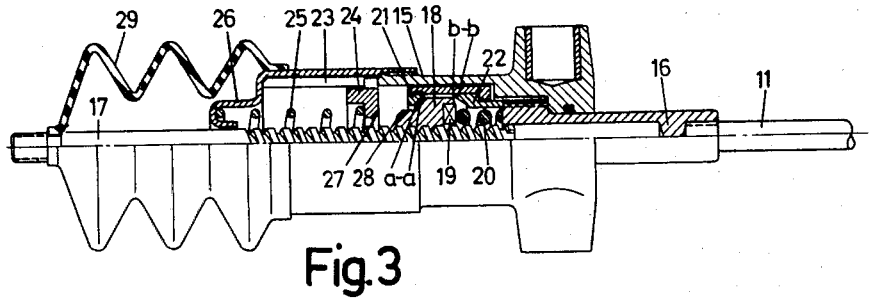

The adjuster shown in FIG. 3 comprises a housing 15 and relatively telecopically displaceable force-input and rod parts 16 and 17. The force-input part 16 is connected to the rod 11 and the rod part 17 is adapted to be connected directly or indirectly to the lever 9 shown in FIG. 1. The part 16 is of tubular shape and is adapted to accommodate a screw-threaded end portion of the rod part 17. The pitch of the screw-thread is such that a nut 18 carried by the rod part 17 will rotate if free and axially loaded. The nut 18 carries a ball bearing 19 of the axial type and a strong prestressed compression spring 20 is mounted between said ball bearing 19 and a shoulder on the tubular part 16. During operation the rod 11 will initially be moved towards the left, and for explanation purposes this direction will be called herein the forward direction. The nut 18 is provided with forwardly and rearwardly directed coupling surfaces adapted to engage rearwardly and forwardly directed coupling surfaces on sleeves 21 and 22. The sleeve 21 is shown as formed by a flanged cylindrical part in which an annular part is secured by screw-threads, and is provided with an inwardly directed shoulder frictionally engaging an outwardly directed shoulder on the sleeve 22 which is rigidly connected to the tubular part 16. The sleeves 21 and 22 have oblique annular surfaces for engaging the nut 18 to constitute two couplings designated by a-a and b-b respectively. The force of the spring 20 is transmitted from the front end of the spring 20 through the ball bearing 19, the nut 18, the coupling a-a, the sleeves 21 and 22, the part 16, and back to the rear end of the spring 20. The housing 15 is provided with an axially-extending slot 23 adapted to receive a protrusion on a sleeve 24 which is axially movable relative to the housing 15. The sleeve 24 is loaded by a compression spring 25 bearing against a surface of a sleeve 26 rigidly connected to the housing 15. The sleeve 24 is provided with a rearwardly directed oblique annular coupling surface 27 adapted to engage a forwardly directed coupling surface 28 on the nut 18. A protective rubber sleeve 29 is connected to the rod part 17 as well as to the sleeve 26 in order to give protection against the entrance of dirt and water into the adjuster.

The adjuster shown in FIG. 3 will operate as follows:

The force of the prestressed spring 20 is of a magnitude between the forces represented by the lines A and B in FIG. 2. Thus in an initial stage the spring 20 will be able to transmit the force from the input part 16 to the rod part 17 through the nut 18 and the ball bearing 19. However, as soon as the total clutch-release force transmited exceeds the force of the spring 20 the said soring 20 will be further compressed, the coupling a-a will open, and the coupling b-b will be engaged. The axial distance between the coupling surfaces 27 and 28 is such that a coupling therebetween will normally be established after a travel of the part 16 through a distance represented by the distance from the origin to the point $s_1$ in FIG. 2. In case there is a transmission of greater forces at an earlier stage - e.g. because of wear of the clutch surfaces as previously described in connection with FIG. 1 - the two couplings a-a and b-b may be disengaged at the same time while the nut 18 is loaded axially by the spring 20 through the ball bearing 19. The nut 18 will now start rotating on the rod part 17 while the latter is telescopically displaced further into the part 16. This movement will continue until the sleeve 24 engages the nut 18 and the coupling surfaces 27 and 28 engage so as to prevent further rotation of the nut 18. The slack in the clutch-release linkage has now been adjusted. Upon further forward movement of the rod 11 the coupling b-b will be engaged and the parts 16 and 17 as well as the sleeve 24 will move forwardly relative to the axially immovable housing 15.

During the following rearward movement of the rod 11 the part 16 and rod part 17 as well as the nut 18 and the sleeve 24 will move rearwardly together until the protrusion on the sleeve 24 engages the rear end boundary of the slot 23. The total force transmitted has now decreased to a value corresponding to that of the spring 20. A further rearward movement will cause the coupling b-b to open and the coupling a-a to engage.

The transmitted force will now follow the line A in FIG. 2 and the slack between the ball bearing 8 and the adjacent ends of the levers 7 (FIG. 1) has been restored to its normal value.

Figure 4:
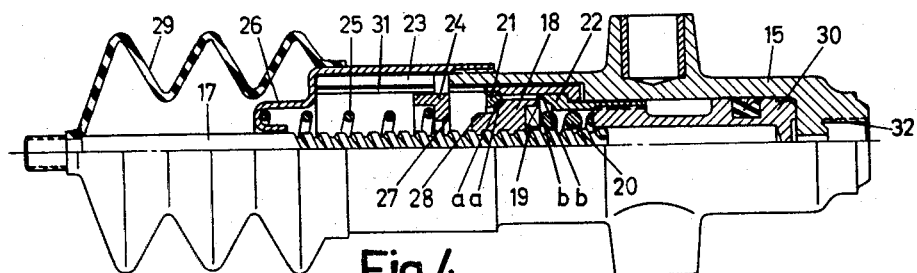

Many clutch mechanisms are released by a transmission including hydraulic means. As shown in FIG. 4 the housing 15 may be designed as a hydraulic cylinder receiving a force-input part in the form of a hollow piston 30 of which the front end is designed substantially like the front end of the tubular part 16 described in connection with FIG. 2. FIG. 4 also shows a forwardly-extending extension of the sleeve 21 provided with a slot 31 through which extends the protrusion on the sleeve 24, thus preventing the piston 30 from rotating relative to the housing 15. The housing 15 is provided with means 32 for connection to a hydraulic pipe system which may be as described below with reference to FIG. 8. The other parts shown in FIG. 4 correspond to parts indicated by like reference numerals and shown in FIG. 3.

The operation of the adjuster shown in FIG. 4 is, of course, generally similar to the operation of the adjuster shown in FIG. 3. However, in principle the hydraulic transmission will operate as will be understood from FIG. 8 in which a downward travel of the pedal 13 will cause a movement towards the left of a rod 11 which acts as a piston rod for a piston 32 moving in a cylinder 33 which is connected by a pipe 34 to the cylinder housing 15. A replenishing reservoir 35 ensures that the hydraulic system is always filled with hydraulic fluid. In case the slack between the ball bearing 8 and the inner ends of the levers 7 (only one of which is shown in FIG. 8) becomes smaller than a predetermined amount the rod part 17 will be moved further into the cylinder housing 15 by being telescopically displaced in the force transmitting direction relative the piston 30.

It will be understood that the spring 25 will act as a return spring for the clutch release force transmission so that there is no need for the return spring 14.

Figure 5:
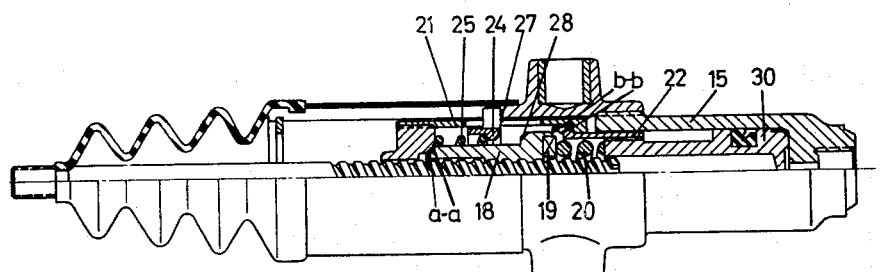

In case for some reason it is desirable to retain the return spring 14 and avoid a return force in the adjuster housing 15 the construction according to FIG. 5 may be used. In this construction the spring 25 is inserted between an abutment on the sleeve 21 and the sleeve 24. The operation of the adjuster is the same as that described in connection with the adjusters shown in FIG. 3 and 4.

The construction shown in FIG. 6 comprises an axially-immovable cylinder housing 40 having a force-input part in the form of a hollow piston 41 movable therein. Hydraulic fluid may be forced into the cylinder 40 through an inlet 42. A rod part 43 having screw-threads of such pitch as to be self-locking carries a correspondingly threaded nut 44. A strong prestressed compression spring 45 and a ball bearing 46 are located between shoulder surfaces on the piston 41 and the nut 44.

A sleeve 47 is mounted slidably within a tube 48 rigidly connected to the housing 40. A slot in said sleeve 47 has a portion 49 which extends helically and a straight portion 50. A screw 51 rigidly connected to the tube 48 extends into the said slot. The nut 44 is provided with a coupling sleeve 52 rigidly connected thereto. Two coupling sleeves 53 and 54 are mounted on the sleeve 47 and are provided with interior cylindrical surfaces of equal diameter arranged coaxially relative to each other; these cylindrical surfaces are engaged by a tightly-wound helical spring 55 forming a one-way clutch between the two coupling sleeves 53 and 54.

The force of the strong spring 45 will be transmitted through axially overlapping shoulders on the nut 44 and the sleeve 47 to the cylinder 41 and back to the spring 45 through the ball bearing 46.

The operation of the adjuster shown in FIG. 6 is as follows:

During a forward movement of the piston 41 in the cylinder 40 the total transmitted force will increase. Forces less than that of the strong spring 45 will be transmitted through the ball bearing 46 and the spring 45 to the nut 44 and the rod part 43. As soon as the total transmitted force exceeds that of the strong spring 45 part of the total transmitted force will be transmitted from the piston 41 through the coupling sleeves 53 and 54 to the coupling sleeve 52 which is rigidly connected to the nut 44. The friction coupling a-a established between axially overlapping parts of the sleeves 47 and 52 will open as soon as the total transmitted force exceeds that of the spring 45.

During the forward movement of the sleeve 47 the screw 51 will move relative to the slot 49,50. As long as the screw 51 travels in the helical portion 49 the sleeve 47 will rotate. Such rotation can only be transmitted to the nut 44 through axially overlapping parts on the sleeves 47 and 54 forming a coupling b-b, the one-way clutch established by the spring 55, and a coupling c-c formed by friction between the sleeves 53 and 52. However, the one-way clutch spring 55 is such that the one-way clutch does not transmit angular movements during the forward movement of the piston 41.

During the return stroke of the piston 41 the sleeve 47 will move rearwardly and the screw 51 enters into the helically shaped portion 49 of the slot while the couplings b-b and c-c are engaged and coupling a-a is open (due to the transmission of a force greater than that of the strong spring 45) the angular movement of the sleeve 47 will be transmitted to the nut 52. An insufficient slack in the linkage will result in the transmission of a too great force for a too long time during the return stroke. In the adjuster shown in FIG. 6 the nut 44 will move in such direction as to increase the slack in case the force transmitted is still above the force of the spring 45 when the screw 51 during the return stroke of the piston 41 enters into the helically shaped portion 49 of the slot.

The construction shown in FIG. 7 comprises an axially-immovable hydraulic housing cylinder 60 having a force-input part in the form of a hollow piston 61 movable therein. The cylinder 60 is provided with a forwardly extending tube 62. A rod part 63 is provided with screw-threads of such pitch as to be self-locking and extends into the hollow piston 61. The rod part 63 carries a complementary nut 64 having a forward flange 65 and a rearward flange 66. At its forward end the hollow piston 61 is provided with a sleeve 67 having an inwardly directed flange 68. The flange 66 on the nut 64 is clamped between the flange 68 and a ball bearing 69 which in turn is loaded by a prestressed strong compression spring 70 which bears against a shoulder on the hollow piston 61.

A sleeve 71 is arranged in the tube 62 and is guided relative thereto by a screw 72 fastened to the tube 62 and extending into a slot 73,74 in the sleeve 71. The front portion 73 of the slot is helically shaped whereas the rear portion 74 extends straight longitudinally. A coupling sleeve 75 is journalled in the sleeve 71 and is retained by a locking ring 76. A tightly-wound helical spring 77 forms a one-way clutch between the sleeves 71 and 75. A tubular distance element 78 and a ball bearing 79 are mounted between the flange 68 and a flange 80 on the coupling sleeve 75.

The adjuster shown in FIG. 7 will operate as follows:

A compression force which is less than the force of the spring 70 will be transmitted from the piston 61 through the spring 70 and the ball bearing 69 to the nut 64 and further to the rod part 63. When the compression force is greater the flange 80 will contact the flange 65 and the force in excess of the force of the spring 70 will be transmitted from the piston 61 through the sleeve 67, the flange 68, the ball bearing 79, the tubular element 78, the flange 80, the flange 65 and the nut 64 to the rod part 63. During the forward movement of the piston 61 and the rod part 63 the sleeve 71 will participate in said forward movement while the tube 62 will remain stationary. Thus the sleeve 71 will be rotated while the screw 72 is moving in the helical portion 73 of the slot. This rotary movement will not be transmitted to the coupling sleeve 75 as the one-way clutch formed by the spring 77 cannot transmit any torque in this direction of rotation.

During the return of the sleeve 71 relative to the tube 62 the said sleeve 71 will start rotation in the opposite direction as soon as the screw 72 enters into the helically shaped portion 73 of the slot in the sleeve 71. This rotation will be transmitted to the coupling sleeve 75 by the spring 77 and the rotation will be conveyed to the sleeve 65 if this sleeve 65 is in frictional contact with the flange 80 due to the transmission of a force greater than the force of the spring 70 at that moment. The rotation of the sleeve 65 and thus of the nut 64 will cause a rearward movement of the rod part 63 relative to the piston 61 and thus an increase of the slack in the clutch release transmission.

It will be seen that each of the illustrated slack adjusters is of the kind defined and comprises a nut 18 or 44 or 64 rotatable on a screw-threaded rod part 17 or 43 or 63 which is axially movable for transmitting clutch-release force, and for slack-adjustment purposes is telescopically displaceable in relation to an axially-movable force-input part 16 or 30 or 41 or 61. Each adjuster has force-responsive means constituted by a prestressed compression spring 20 or 45 or 70 mounted between and exerting force on the nut and the force-input part and responsive when the adjuster is transmitting force sufficient to release the clutch. Each adjuster also has travel-responsive means including the sleeves 21 and 22 or 47 or 67 which in response to the axial travels of the rod part and the force-input part relative to an axially-immovable housing 14 or 40 or 60 prevent or permit rotation of said nut 18 or 44 or 64, all so arranged that in the event of the adjuster transmitting force sufficient to release the clutch prior to the axial travels in unison of said rod part 17 or 43 or 63 and said force-input part 16 or 30 or 41 or 61 relative to said housing 15 or 40 or 60 reaching a predetermined minimum the rod part is telescopically displaced into the force-input part and the slack in the adjuster is increased.

We claim:

1. Clutch-release apparatus with an automatic axially-acting slack adjuster of the kind comprising a nut rotatable on a screw-threaded rod part which is axially movable for transmitting clutch-release force comprising in combination, an axially-immovable housing containing said adjuster, a clutch, a linkage connected for transmitting force to release said clutch having said slack adjuster incorporated therein to transmit the force, force-responsive means in said adjuster including a clutching mechanism having an operation threshold which responds to the force from said force-input part to permit rotation of said nut only when the adjuster is transmitting force of a magnitude sufficient to release the clutch, and travel-responsive means in said adjuster including a further clutching mechanism which in response to the axial travels of said rod part and said force-input part more than a predetermined distance relative to said axially-immovable housing prevents rotation of said nut to adjust the slack, the foregoing arrangement being so interconnected that said force responsive means when the adjuster transmits force sufficient to release the clutch prior to the axial travels more than said predetermined distance indicated by said travel responsive means causes rotation of said nut to thereby telescopically displace said rod part relative to said force-input part and thereby increase the slack in the linkage.

2. A slack adjuster according to claim 1, wherein the said force-responsive means is constituted by a prestressed compression spring mounted between and exerting force on said nut and said force-input part.

3. A clutch release linkage as defined in claim 1 wherein said force responsive means comprises a spring having a predetermined compressive force.

4. Clutch-release apparatus as defined in claim 1 wherein said screw-threaded rod has a pitch on the screw-thread such that the nut will rotate if free and axially loaded.

5. Clutch-release apparatus as defined in claim 1 wherein said screw-threaded rod is provided with screw-threads of such pitch as to be self-locking.

* * * * *